(12) United States Patent
Pihl

(10) Patent No.: US 11,668,189 B2
(45) Date of Patent: Jun. 6, 2023

(54) WIRELESS DATA AND POWER TRANSFER FOR DOWNHOLE TOOLS

(71) Applicant: Halliburton Energy Services, Inc., Houston, TX (US)

(72) Inventor: Joachim Alexander Pihl, Sandefjord (NO)

(73) Assignee: Halliburton Energy Services, Inc., Houston, TX (US)

( * ) Notice: Subject to any disclaimer, the term of this patent is extended or adjusted under 35 U.S.C. 154(b) by 385 days.

(21) Appl. No.: 16/478,670

(22) PCT Filed: Aug. 22, 2018

(86) PCT No.: PCT/US2018/047493
§ 371 (c)(1),
(2) Date: Jul. 17, 2019

(87) PCT Pub. No.: WO2020/040756
PCT Pub. Date: Feb. 27, 2020

(65) Prior Publication Data
US 2021/0332697 A1    Oct. 28, 2021

(51) Int. Cl.
*E21B 47/13* (2012.01)
*E21B 17/02* (2006.01)
(Continued)

(52) U.S. Cl.
CPC .......... *E21B 47/13* (2020.05); *E21B 17/0283* (2020.05); *E21B 41/0085* (2013.01); *E21B 47/12* (2013.01); *H04B 5/0037* (2013.01)

(58) Field of Classification Search
CPC ...... E21B 47/12; E21B 47/13; E21B 17/0283; E21B 41/0085; H04B 5/0037
See application file for complete search history.

(56) References Cited

U.S. PATENT DOCUMENTS 7,366,465 B2 * 4/2008 Barink ................ G06K 7/0008
340/572.1
7,847,671 B1   12/2010 Riachentsev et al.
(Continued)

FOREIGN PATENT DOCUMENTS

WO    2008005193    1/2008
WO    2009029067    3/2009

OTHER PUBLICATIONS

International Patent Application No. PCT/US2018/047493, International Search Report and Written Opinion dated May 17, 2019, 12 pages.

*Primary Examiner* — Franklin D Balseca
(74) *Attorney, Agent, or Firm* — Kilpatrick Townsend & Stockton LLP

(57) ABSTRACT

Power signals and data signals can be wirelessly transmitted from a surface read-out unit to a downhole tool and the downhole tool can wirelessly transmit data about an environment of a wellbore to the surface read-out unit. The downhole tool can be used for a wellbore operation and include at least one coupler. The surface read-out unit can wirelessly transmit the power signals to the downhole tool and can wirelessly transceive data signals with the downhole tool. The surface read-out unit includes at least one wireless coupler through which to transfer the power signals and the data signals to the at least one coupler of the downhole tool.

15 Claims, 7 Drawing Sheets

(51) Int. Cl.
E21B 41/00 (2006.01)
H04B 5/00 (2006.01)
E21B 47/12 (2012.01)

(56) References Cited

U.S. PATENT DOCUMENTS

| | | | | |
|---|---|---|---|---|
| 8,682,261 | B2 * | 3/2014 | Ozaki | H04B 1/0057 |
| | | | | 455/82 |
| 9,347,277 | B2 | 5/2016 | Taherian et al. | |
| 9,490,875 | B2 * | 11/2016 | Shylendra | H04B 5/0075 |
| 10,770,923 | B2 * | 9/2020 | Hansen | A61N 1/3787 |
| 2003/0218547 | A1 | 11/2003 | Smits et al. | |
| 2004/0221986 | A1 | 11/2004 | Hosie et al. | |
| 2005/0145416 | A1 | 7/2005 | Reed et al. | |
| 2006/0220650 | A1 | 10/2006 | Lovell et al. | |
| 2007/0010295 | A1 * | 1/2007 | Greene | H02J 50/00 |
| | | | | 455/572 |
| 2007/0257812 | A1 | 11/2007 | Lasater et al. | |
| 2011/0073303 | A1 | 3/2011 | Taherian et al. | |
| 2011/0172525 | A1 * | 7/2011 | Neer | A61M 5/14546 |
| | | | | 600/432 |
| 2015/0377016 | A1 | 12/2015 | Ahmad | |
| 2017/0089194 | A1 * | 3/2017 | Donderici | E21B 47/12 |
| 2017/0204724 | A1 | 7/2017 | Godager et al. | |
| 2018/0006506 | A1 | 1/2018 | Baer et al. | |
| 2021/0158121 | A1 * | 5/2021 | McBride | H04L 9/3226 |

* cited by examiner

US 11,668,189 B2

WIRELESS DATA AND POWER TRANSFER FOR DOWNHOLE TOOLS

TECHNICAL FIELD

The present disclosure relates generally to devices for use in a well system environment. More specifically, but not by way of limitation, this disclosure relates to downhole tools with high-speed contactless couplers that transfer power and data.

BACKGROUND

A wellbore drilling environment (e.g., an oil or gas well environment) can include a downhole tool used to measure and collect data about the conditions within the wellbore. The downhole tool, which can be a drilling tool, can be removed from the well to access the measured data. A separate device, such as a surface read-out unit, can connect to the downhole tool via a physical plug to retrieve the data measured by the downhole tool and provide power to the downhole tool. But, physically accessing the connection port on the downhole tool may introduce dirt, contaminants, and other corrosive elements that may interfere with the normal operating functions of the downhole tool (e.g., the dirt and contaminants may prevent the seal at the downhole tool connection port from sealing properly for further use).

DETAILED DESCRIPTION

Figure 1:
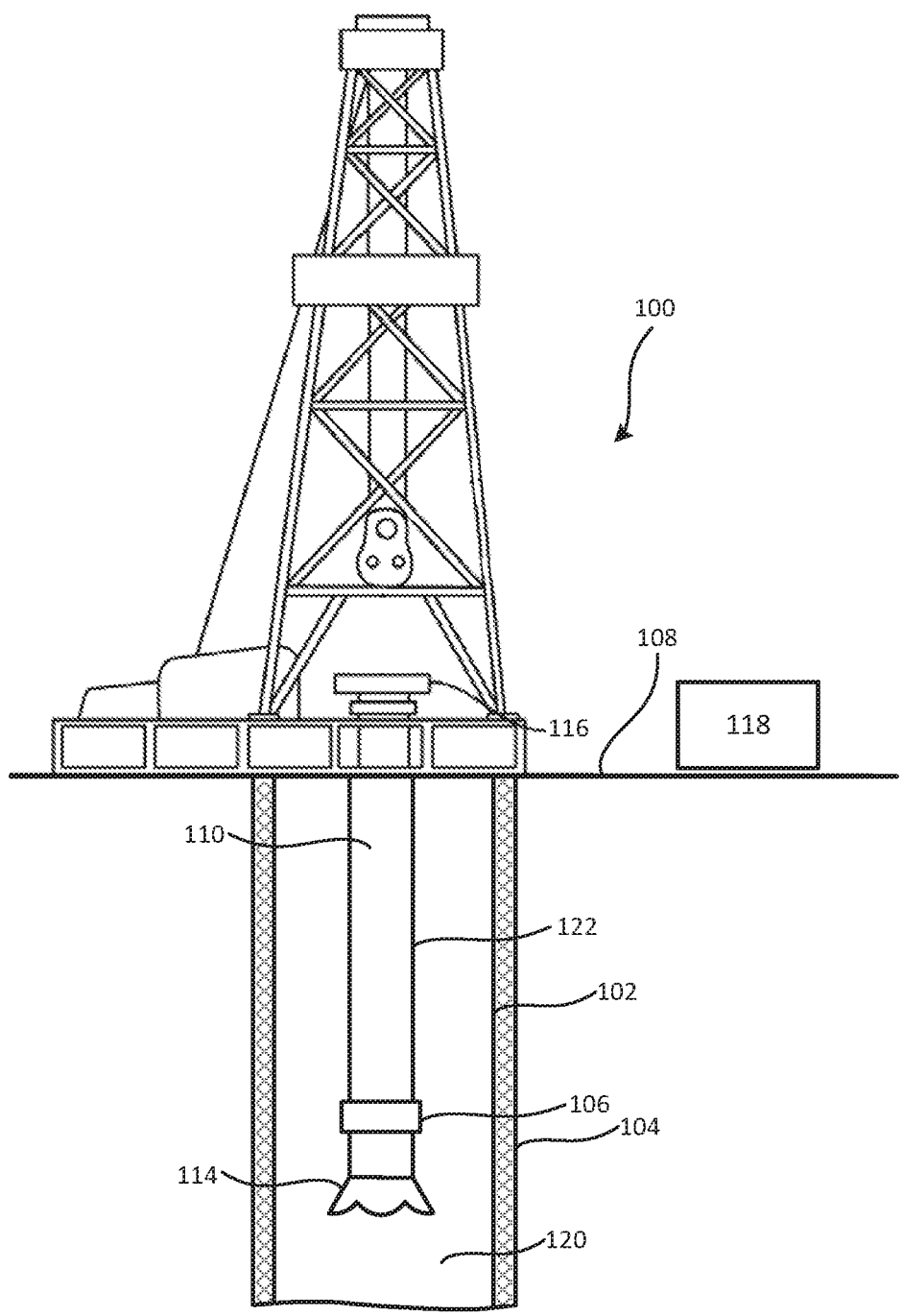
FIG. 1 is a contextual view of an example of a well system that includes a surface read-out unit and a downhole tool according to one aspect of the disclosure.

Certain aspects and features of the present disclosure relate to transmitting power from a surface read-out unit to a downhole tool, and transceiving data signals between the surface read-out unit and the downhole tool, via wireless couplers. A downhole tool can be removed from the wellbore and wirelessly coupled to a surface read-out unit such that the downhole tool does not have to be opened and resealed to access a communications port. This can increase equipment durability (e.g., no wear and tear from constant resealing, and no seal for corrosive elements to enter), reduce access time to the collected data, and reduce time to reset the downhole tool. Power can be wirelessly transferred from the surface read-out unit to power circuitry in the downhole tool to power the downhole tool for data collection purposes. And data can be bi-directionally and wirelessly transferred between the surface read-out unit and the downhole tool.

Wireless couplers can be used to transfer power and data signals at high speeds, thus eliminating the need for a direct physical connection for the purposes of transceiving data with a downhole tool within a wellbore drilling environment. Transceiving data can include transmitting data, receiving data, or both transmitting and receiving data. Data can be transceived when data is transmitted, when data is received, or when data is both transmitted and received at the same time by a device that is capable of both transmitting and receiving data. A wireless coupler can wirelessly transmit a combination of power and data signals, such that the power and data signals are combined and transceived simultaneously (e.g., the couplers transmit and receive power and data signals in a similar fashion as Power over Ethernet, except in a wireless format). A surface read-out unit and a downhole tool may each include at least one wireless coupler to communicatively couple with at least one other wireless coupler.

An example of a wireless coupler includes split-core radio frequency (RF) transformers built from pot cores within a magnetic, non-conductive material. The magnetic outer material of the coupler allows for a wireless coupler to magnetically couple to another wireless coupler while being separated by a nonconductive material (e.g., the outer housing of a downhole tool or air) and without requiring that a direct, physical electrical connection be established. Once a magnetic coupling has occurred, a surface read-out unit may then transmit power signals to, and transceive data signals with, the downhole tool via at least one magnetically coupled pair of wireless couplers.

In some examples, filters can be used to facilitate power and data transfer. A surface read-out unit may include a combiner filter, which may combine power signals and data signals before transmitting the combined signals via the wireless coupler in the surface read-out unit to the wireless coupler in the downhole tool. Respectively, a downhole tool may include a splitter filter, which may separate power signals and data signals when wirelessly receiving a combined signal from a surface read-out unit. The use of filters in the system can allow for power signals and data signals to be transceived simultaneously across one magnetically coupled pair of wireless couplers. The power signals can be used by power conversion circuitry, which may be a full-wave rectifier, in the downhole tool to power the transceiver for transmitting data captured in the downhole environment to the surface read-out unit.

The system, including a surface read-out unit and a downhole tool, may transceive data signals bi-directionally (i.e., data may be sent and received by both the surface read-out unit and the downhole tool) as well as in full duplex mode (i.e., data may be sent and received at the same time by either the surface read-out unit or the downhole tool). Data signals may include any information relating to measurements taken by the downhole tool or data necessary to reprogram or power cycle the downhole tool. The surface read-out unit and downhole tool may include a transceiver to configure, in conjunction with a controller for processing data, wirelessly transmitting and receiving, via at least one pair of communicatively coupled wireless couplers, data signals between a surface read-out unit and a downhole tool.

The transceiver may be an Ethernet transceiver for transceiving data between a surface read-out wireless coupler and a downhole tool wireless coupler at high speeds. Gigabit Ethernet connectivity may be used, with the surface read-out unit and downhole tool each having at least four wireless couplers, when bandwidth is 125 MHz or more with acceptable attenuation (e.g., transmission loss). Amplifier circuits can be used within either the surface read-out unit or the downhole tool in order to compensate for losses.

In some examples, directional couplers can be included in the downhole tool and the surface read-out unit to route signals. Directional couplers may be connected to both the transmit and receive electrical connections of the transceiver (e.g., TX+/TX−, RX+/RX−, respectively). A directional coupler can properly route data signals when a paired set of wireless couplers of the surface read-out unit and the downhole tool is used to bi-directionally transmit and receive data signals. The directional coupler of the surface read-out unit may receive data signals from the TX+/TX− electrical connections of the surface read-out transceiver, and may route the data signals to the surface read-out wireless coupler to send to the downhole tool wireless coupler. The data signals received by the downhole tool may be sent to the directional coupler of the downhole tool, which may then route the signals to the RX+/RX− electrical connections of the downhole tool transceiver. Inversely, the directional coupler of the downhole tool may receive data signals from the TX+/TX− electrical connections of the downhole tool transceiver, and may route the data signals to the downhole tool wireless coupler to send to the surface read-out unit wireless coupler. The data signals received by the surface read-out unit may be sent to the surface read-out directional coupler that can route the signals to the RX+/RX− electrical connections of the surface read-out transceiver. In this example, the use of directional couplers can allow for simultaneously transmitting and receiving data signals across a single set of communicatively paired wireless couplers. In other examples, transmit and receive data paths may be connected directly and may not need to be bifurcated. Directional couplers may not be needed if, for example, attenuation is found to be low enough at certain frequencies (e.g., 10 MHz or 25 MHz) and transceivers can be used directly for data transfer. Amplifier circuits may be added in those examples to either end of a link to compensate inductive coupler loss.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 depicts a well system 100 that includes surface read-out unit 118 and downhole tool 106 according to one example. The well system 100 includes a wellbore 102 extending through various earth strata. The wellbore 102 extends through a hydrocarbon bearing subterranean formation 104. The downhole tool 106 can be coupled to a drill string 110 that can be deployed into or retrieved from the wellbore 102. The downhole tool can be any downhole tool or device that can be inserted into a well or retrievable from a well. The drill string 110 extends from the surface 108 to the subterranean formation 104.

A wellbore may be created by drilling into the subterranean formation 104 using the drill string 110. A wellbore drill assembly 122 can be driven and can be positioned or otherwise arranged at the bottom of the drill string 110 extended into the wellbore 102 from a derrick 116 arranged at the surface 108. The wellbore drill assembly 122 may include a drill bit 114 operatively coupled to the drill string 110, which may be moved axially within a drilled wellbore 102 as attached to the drill string 110.

The wellbore 102 can include fluid 120. The fluid 120 can flow in an annulus positioned between the wellbore drill assembly 122 and a wall of the wellbore 102. In some examples, the fluid 120 can contact the downhole tool 106. This contact allows the downhole tool 106 to measure conditions within the wellbore. Additionally, the downhole tool 106 may perform measurements related to the wellbore drill assembly 122. The downhole tool 106 can be used to capture data about the wellbore environment in a logging while drilling ("LWD") or measurement while drilling ("MWD") configuration.

The drill string 110 can be used to retrieve the downhole tool 106 from within the wellbore drill assembly 122. Upon retrieval and reaching the surface 108, the downhole tool 106 may communicate with surface read-out unit 118 to obtain data captured by the downhole tool 106. The downhole tool 106 may magnetically and wirelessly couple to the surface read-out unit 118 via at least one set of paired wireless couplers. Once magnetically coupled at the surface 108, the surface read-out unit 118 may transmit power signals to the downhole tool 106 that can be used to power on-board circuitry of the downhole tool 106. The downhole tool 106 and the surface read-out unit 118 may further bi-directionally transceive data signals across at least one set of paired wireless couplers. The data signals may include any information relating to measurements taken by the downhole tool 106 or data necessary to reprogram or power cycle the downhole tool 106 at the instruction of the surface read-out unit 118. The surface read-out unit 118 unit may reset the downhole tool 106 for additional iterations of measurements before lowering the downhole tool 106 into the wellbore drill assembly 122 via the drill string 110, or using the downhole tool 106 to capture data about another well system.

Figure 2:
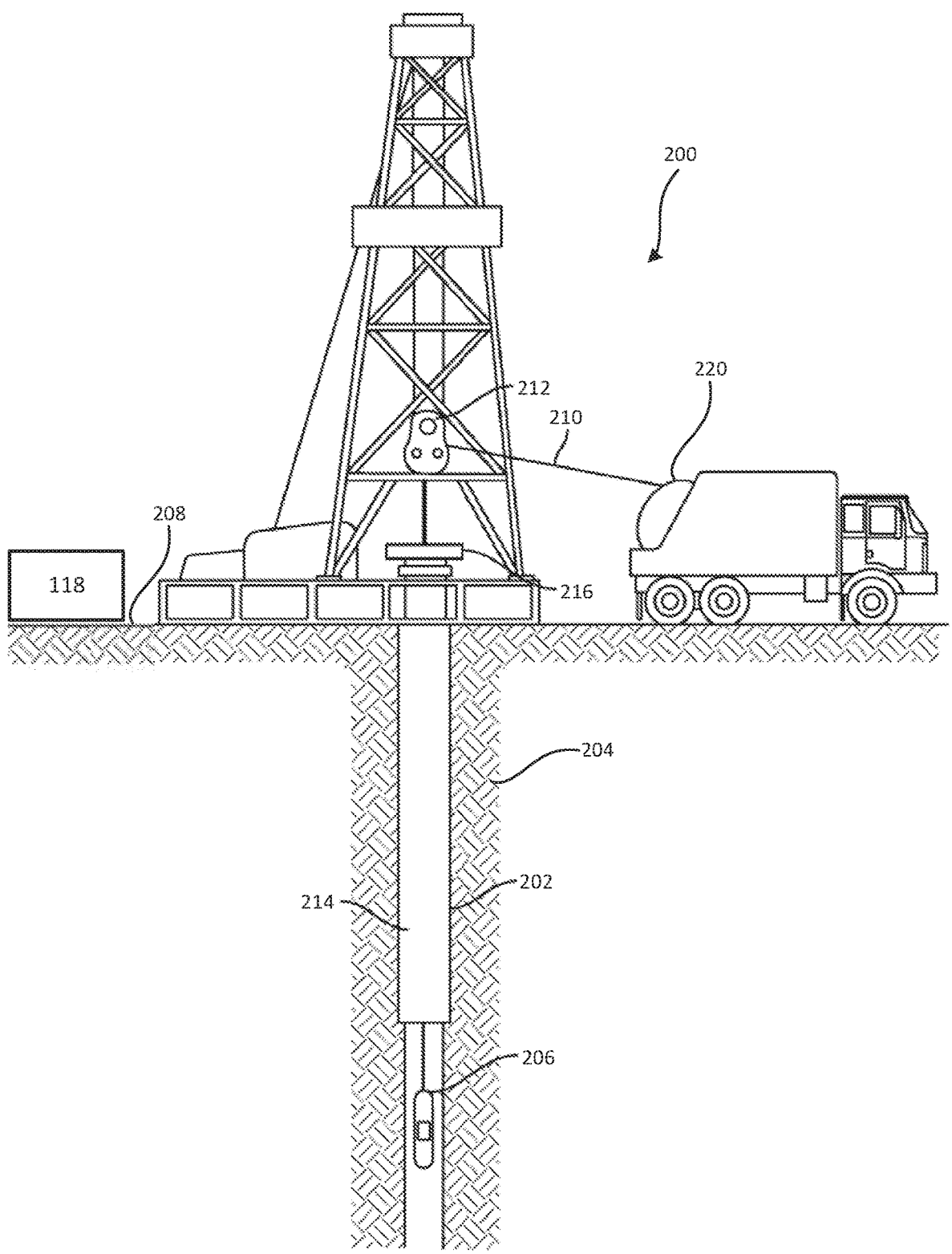
FIG. 2 is a contextual view of an example of a well system that includes a surface read-out unit and a downhole tool according to another aspect of the disclosure.

FIG. 2 depicts a well system 200 that includes surface read-out unit 118 and downhole tool 206 according to one example. The well system 200 includes a wellbore 202 extending through various earth strata. The wellbore 202 extends through a hydrocarbon bearing subterranean formation 204. The downhole tool 206 can be coupled to a conveyance 210 (e.g., wireline, slickline, or coiled tube) that can be deployed into or retrieved from the wellbore 202, for example, using a winch 212. A casing string 214 (e.g., a metal casing) can extend from the surface 208 into the subterranean formation 204. A downhole tool 206 can be driven and can be positioned or otherwise arranged at the bottom of the conveyance 210 extended into the wellbore 202 arranged at the surface 208.

A spooling system 220 may be located at the surface 208 to raise and lower the conveyance 210. The spooling system 220 can position the conveyance 210 for purposes of lowering and raising the conveyance 210 in the wellbore 202. The spooling system 220 can move the downhole tool 206 axially within the wellbore 202 as attached to the conveyance 210. A derrick 216 can include the winch 212 usable to lower and raise the conveyance 210. The conveyance 210, using the winch 212 and the spooling system 220, can be used to retrieve the downhole tool 206 from within the wellbore 202.

The downhole tool 206 can be used to measure conditions within the wellbore 202 and about the wellbore environment. Upon retrieval and reaching the surface 208, the downhole tool 206 may communicate with the surface read-out unit 218 to obtain data captured by the downhole tool 206 as described below in examples. The surface read-out unit 218 unit may reset the downhole tool 206 for additional iterations of measurements before lowering the downhole tool 206 into the wellbore 202 via the conveyance 210, or using the downhole tool 206 to capture data about another well system.

Figure 3:
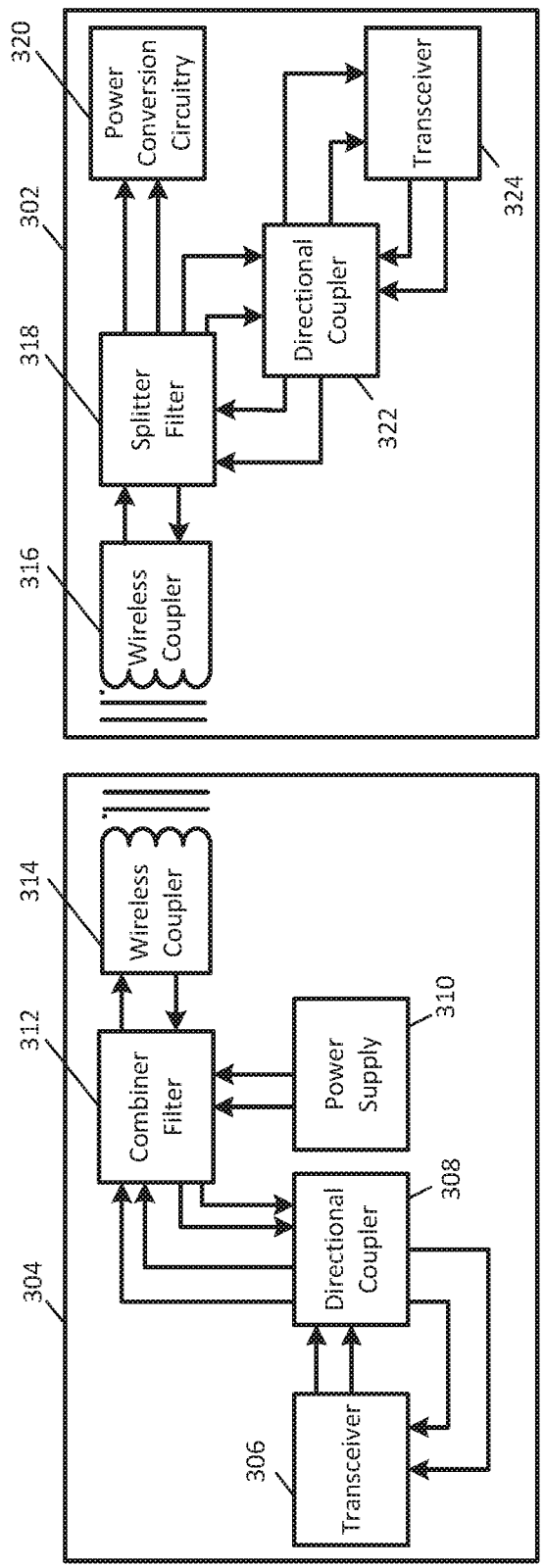
FIG. 3 is a block diagram of a system for transmitting power and transceiving data signals via a pair of wireless couplers according to one aspect of the disclosure.

FIG. 3 depicts a block diagram that includes a surface read-out unit 304 and downhole tool 302 according to one example. The downhole tool 302 can be any downhole tool or device that can be inserted into a well or retrievable from a well (e.g., downhole tool 106, 206). The surface read-out unit 304 can be any communication device used for wirelessly communicating with a downhole tool (e.g., surface read-out unit 118).

In this example, the surface read-out unit 304 can obtain data from downhole tool 302 at the surface of a wellbore. The surface read-out unit 304 includes a transceiver 306, a directional coupler 308, a power supply 310, a combiner filter 312, and a wireless coupler 314. The downhole tool 302 includes a wireless coupler 316, a splitter filter 318, power conversion circuitry 320, a directional coupler 322, and a transceiver 324. Power signals and data signals may be wirelessly transmitted from the surface read-out unit 304 to the downhole tool 302. The power signals may be used to power circuitry within the downhole tool 302, and data signals may be wirelessly transmitted back to the surface read-out unit 304 in response to the data signals received by the downhole tool 302.

Each of the surface read-out unit 304 and downhole tool 302 may include, as part of the same unit or externally connected, a controller for processing data and controlling functions, a memory device, or any other electronic components necessary for configuration and operation of transceiving data signals. The controller may be communicatively and electronically coupled to the memory and the components depicted in FIG. 3 via a bus.

The wireless coupler 314 can be positioned proximate to the wireless coupler 316 at the surface of a wellbore. The wireless coupler 314 and the wireless coupler 316 may magnetically couple to each other, thus establishing a wireless communications channel across the wireless coupler 314 and the wireless coupler 316. The wireless coupler 314 and the wireless coupler 316 can be physically separated by the outside housing of the downhole tool 302. The outside casing may be a nonconductive and nonmagnetic material. The surface read-out unit 304 and downhole tool may be magnetically and wirelessly communicatively coupled without requiring a direct physical electrical connection.

The example of FIG. 3 depicts a system that allows for transferring power signals and data signals simultaneously across a single set of paired wireless couplers (i.e., wireless coupler 314 magnetically coupled to wireless coupler 316). Data signals may be provided by the transceiver 306 to the directional coupler 308 and directed to the combiner filter 312. Power signals may be provided by the power supply 310, which may be a power supply oscillator, to the combiner filter 312. The combiner filter 312, after receiving power signals from the power supply 310 and data signals from the directional coupler 308, may then combine the low frequency power signals with the high frequency data signals such that a single stream of RF energy may be created. The single stream can include the signal characteristics of both the original power signals and original data signals. Using a combiner filter 312 can allow for simultaneous transmission of the power and data signals by adding the signals together into the single stream.

The combiner filter 312 may transmit the combined power signals and data signals to the wireless coupler 314. The wireless coupler 314 can wirelessly transmit the combined power signals and data signals to the wireless coupler 316 located in the downhole tool 302. The wireless coupler 316 can route the combined power and data signals to the splitter filter 318, which can separate the combined power signals and data signals. In some examples, the splitter filter 318 can output the power signals as low frequency power signals and the data signals as high frequency signals.

The splitter filter 318 can transmit the power signals to the power conversion circuitry 320. Power conversion circuitry 320 can use the power signals received from splitter filter 318 to power electronics within the downhole tool 302. The electronics can include the transceiver 324, the directional coupler 322, the splitter filter 318, or any other electronic components for transceiving data signals with the surface read-out unit 304.

The splitter filter 318 may transmit the separated data signals to the directional coupler 322. The directional coupler 322 can transmit the data signals to transceiver 324. In response to the data signals, the downhole tool 302 may perform any number of functions including power cycling, resetting, or programming, or retrieving data, measured and stored by the downhole tool 302 from within the wellbore. Depending on the functions performed by the downhole tool 302 in response to the received data signals, any number of related data signals (e.g. response indicating a successful reprogramming, response including the requested data collected by the downhole tool 302), may be routed to the transceiver 324 to transmit the information to the surface read-out unit 304.

The transceiver 324 may transmit the data signals to the directional coupler 322. The directional coupler 322 can transmit the data signals to the splitter filter 318, which can transmit the data signals to the wireless coupler 316. The wireless coupler 316 can wirelessly transmit the data signals to the wireless coupler 314 of the surface read-out unit 304. After receiving the data signals, the wireless coupler 314 can transmit the data signals to the combiner filter 312, which can transmit the data signals to the directional coupler 308. The directional coupler 308 can transmit the data signals to the transceiver 306. Upon receiving the data signals, the transceiver 306 may then transmit the data via a bus to a controller or memory device communicatively coupled to the surface read-out unit 304 components depicted in FIG. 3.

The combination of the directional couplers 308 and 322 with combiner filter 312 and splitter filter 318 can allow for full duplex, bi-directional communications across a single pair of wireless couplers, thus reducing the number of couplers used to implement a system in a wellbore drilling environment for wirelessly transceiving power signals and data signals at high speeds.

Figure 4:
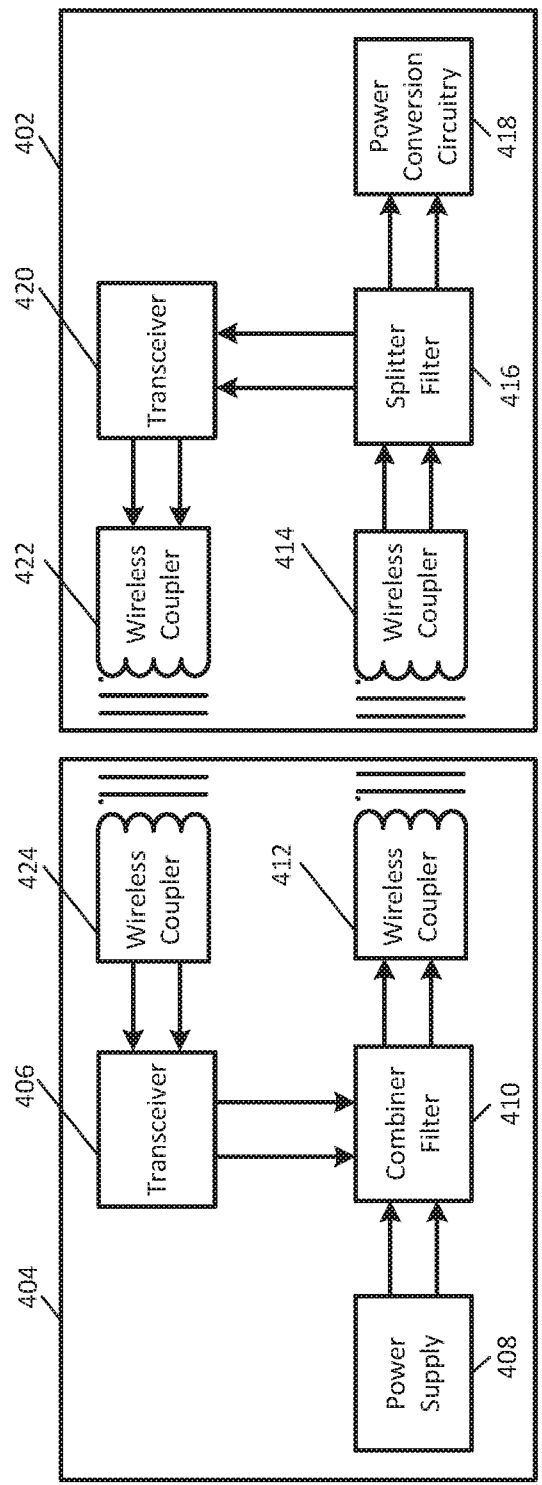
FIG. 4 is a block diagram of a system for transmitting power and transceiving data signals via two pairs of wireless couplers according to one aspect of the disclosure.

A downhole tool and a surface read-out unit usable in an environment such as that shown in FIG. 1 or 2 may include different configurations than the configuration shown in FIG. 3. For example, FIG. 4 depicts a block diagram that includes a surface read-out unit 118 and a downhole tool 402 with a configuration according to another example. The downhole tool 402 can be any downhole tool or device that can be inserted into a well or retrievable from a well (e.g., downhole tool 106, 206). The surface read-out unit 404 can be any communication device used for wirelessly communicating with a downhole tool (e.g., surface read-out unit 118).

In the configuration shown in FIG. 4, signals transmitted by the surface read-out unit 404 can be wirelessly exchanged via a first pair of wireless couplers and signals transmitted by the downhole tool 402 can be exchanged via a second pair of wireless couplers. The surface read-out unit 404 includes a transceiver 406, a power supply 408, a combiner filter 410, and two wireless couplers 412, 424. The downhole tool 402 includes wireless couplers 414, 422, a splitter filter 416, power conversion circuitry 418, and a transceiver 420. Power signals and data signals may be sent from the surface read-out unit 404 to the downhole tool 402 across wireless couplers 412, 414. Data signals may be transmitted from the downhole tool 402 to the surface read-out unit 404 across wireless couplers 422, 424.

After the downhole tool 402 is removed from a wellbore, the surface read-out unit 404 may be used to communicate with the downhole tool 402 at the surface of the wellbore. The wireless coupler 412 can be positioned proximate to the wireless coupler 414 of the downhole tool 402, and the wireless coupler 424 can be positioned proximate to the wireless coupler 422 of the downhole tool 402. The wireless couplers 412, 414 can magnetically couple to each other, and the wireless couplers 422, 424 can magnetically couple to each other to establish two distinct wireless communications channels between the downhole tool 402 and the surface read-out unit 404. The wireless couplers 414, 422 can be physically separated from the wireless couplers 412, 424 in the surface read-out unit 404 by the outside housing of the downhole tool 402, the surface read-out unit 404, or both. The housing may be a nonconductive and nonmagnetic material. The surface read-out unit 404 and the downhole tool 402 may be magnetically and wirelessly communicatively coupled without the need for a direct physical electrical connection between these components.

For example, data signals can be provided from the transceiver 406 to the combiner filter 410 and power signals can be provided by the power supply 408 to the combiner filter 410. The combiner filter 410 can combine the low frequency power signals with the high frequency data signals such that a single stream of RF energy can be created. The single stream can include discernable electrical characteristics of both the original power signals and original data signals. The combined signal can be provided to the wireless coupler 412 for wirelessly transmitting the combined signal to the wireless coupler 414 of the downhole tool 402. The splitter filter 416 in the downhole tool 402 can separate the power signals and the data signals from the single stream. The power signals can be provided to power conversion circuitry 418, which can convert the power signals to power for components of the downhole tool 402. The data signals can be provided to the transceiver 420.

The data signals may represent a request from the surface read-out unit 404 for data stored in the downhole tool 402. In response to the data signals, the transceiver 420 can provide signals that represent data acquired in the wellbore to the wireless coupler 422. The wireless coupler 422 can wirelessly transmit the signals to the wireless coupler 424 of the surface read-out unit 404. The signals can be provided to the transceiver 406 for further processing.

The combiner filter 410, splitter filter 416, and two coupled pairs of wireless couplers can allow for full duplex communications and for wireless transceiving power signals and data signals at high speeds.

Figure 5:
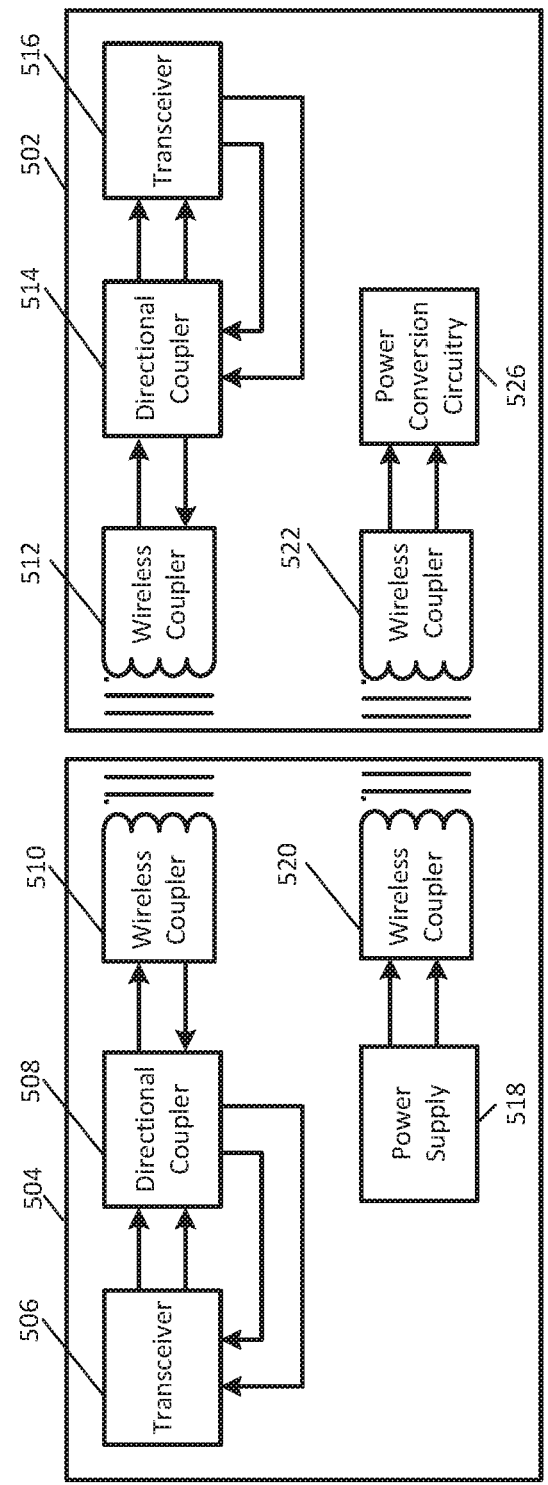
FIG. 5 is a block diagram of a system for transmitting power via a first pair of wireless couplers and transceiving data signals via a second pair of wireless couplers in a different configuration according to one aspect of the disclosure.

FIG. 5 depicts a block diagram that includes a surface read-out unit 504 and downhole tool 502 that provides two channels for communicating power signals and data signals in a different configuration as compared to FIG. 3 or 4, according to one example. The downhole tool 502 can be any downhole tool or device that can be inserted into a well or retrievable from a well (e.g., downhole tool 106, 206). The surface read-out unit 504 can be any communication device used for wirelessly communicating with a downhole tool (e.g., surface read-out unit 118).

In this example, two wireless coupler pairs are included. One pair—wireless coupler 510 and wireless coupler 512—can provide a wireless channel through which data signals can be transceived bi-directionally between the surface read-out unit 504 and the downhole tool 502. Another pair—wireless coupler 520 and wireless coupler 522—can provide a wireless channel through which power signals can be transmitted from the surface read-out unit 504 to the downhole tool 502. The power signals, which can be supplied from a power supply 518, can be provided to power conversion circuitry 524 for providing power to the downhole tool 502. In the data signal path, each of the surface read-out unit 504 and the downhole tool 502 can include a respective directional coupler 508, 514 for coupling uplink and downlink signals between the transceiver 506 in the surface read-out unit 504 and the transceiver 516 in the downhole tool 502.

Providing separate communication paths for power signals and data signals across paired wireless couplers may reduce the signal loss that can occur when converting power signals and data signals into a single same-frequency stream.

Figure 6:
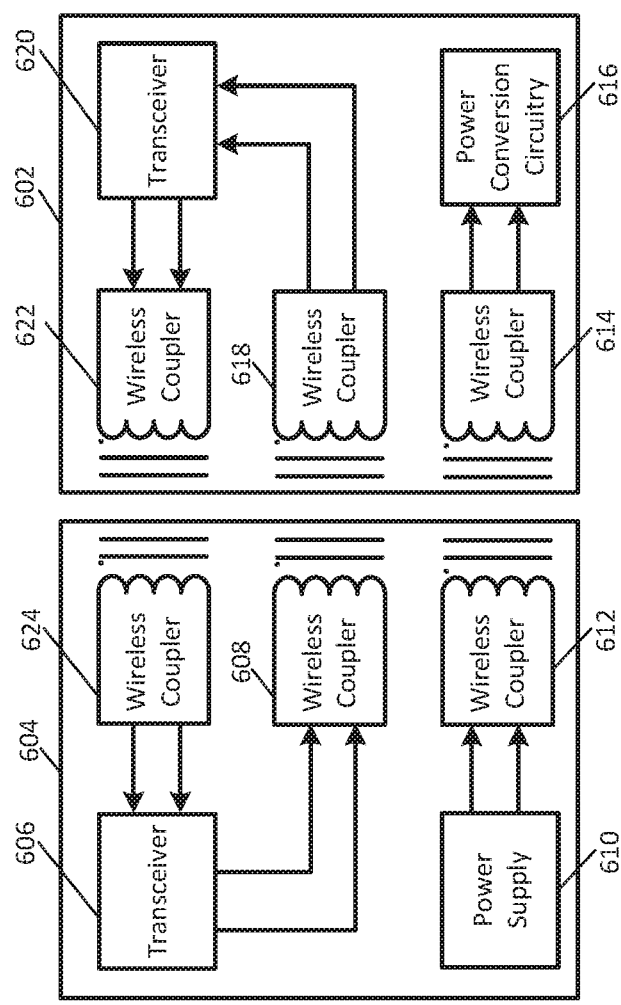
FIG. 6 is a block diagram of a system for transceiving power and data signals via three pairs of wireless couplers according to one aspect of the disclosure.

Additional wireless couplers can be added, as needed, to provide any number of wireless communication paths (or channels). FIG. 6 depicts a block diagram that includes a surface read-out unit 604 and a downhole tool 602 with three pairs of wireless couplers, according to one example. The downhole tool 602 can be any downhole tool or device that can be inserted into a well or retrievable from a well (e.g., downhole tool 106, 206). The surface read-out unit 604 can be any communication device used for wirelessly communicating with a downhole tool (e.g., surface read-out unit 118).

In this example, three pairs of wireless couplers can provide three communication paths for wirelessly transmitting data signals or power signals between the surface read-out unit 604 and the downhole tool 602 without requiring a directional coupler or similar device for bidirectional communication. A wireless coupler pair that includes wireless coupler 612 and wireless coupler 614 can provide a communication path for wirelessly transmitting power signals from a power supply 610 in the surface read-out unit 604 to power conversion circuitry 616 for providing power to components in the downhole tool 602. Another wireless coupler pair that includes wireless coupler 608 and wireless coupler 618 can provide a communication path for wirelessly transmitting data signals from a transceiver 606 in the surface read-out unit 604 to a transceiver 620 in the downhole tool 602. A further wireless coupler pair that includes wireless coupler 624 and wireless coupler 622 can provide a communication path for wirelessly transmitting uplink data signals from the transceiver 620 in the downhole tool 602 to the transceiver 606 in the surface read-out unit 604.

Using three pairs of wireless couplers can allow for full duplex communications and for wirelessly transceiving power signals and data signals at high speeds without the need of additional on-board circuitry, such as directional couplers, and combiner and splitter filters.

Configurations according to additional examples may include more than three paired couplers. For example, pairing four wireless couplers in a surface read-out unit to four wireless couplers in a downhole tool can allow for two wireless communications channels dedicated to transmitting data signals from the surface read-out unit to the downhole tool, and two additional wireless communications channels dedicated to receiving data signals by the surface read-out unit from the downhole tool. Such an example can allow a Gigabit Ethernet solution to be implemented within the system. Additionally, a fifth pair of wireless couplers can allow for a high speed solution as with four pairs of wireless couplers, with the additional functionality of transmitting power signals to the downhole tool for the purposes of powering on-board circuitry.

Figure 7:
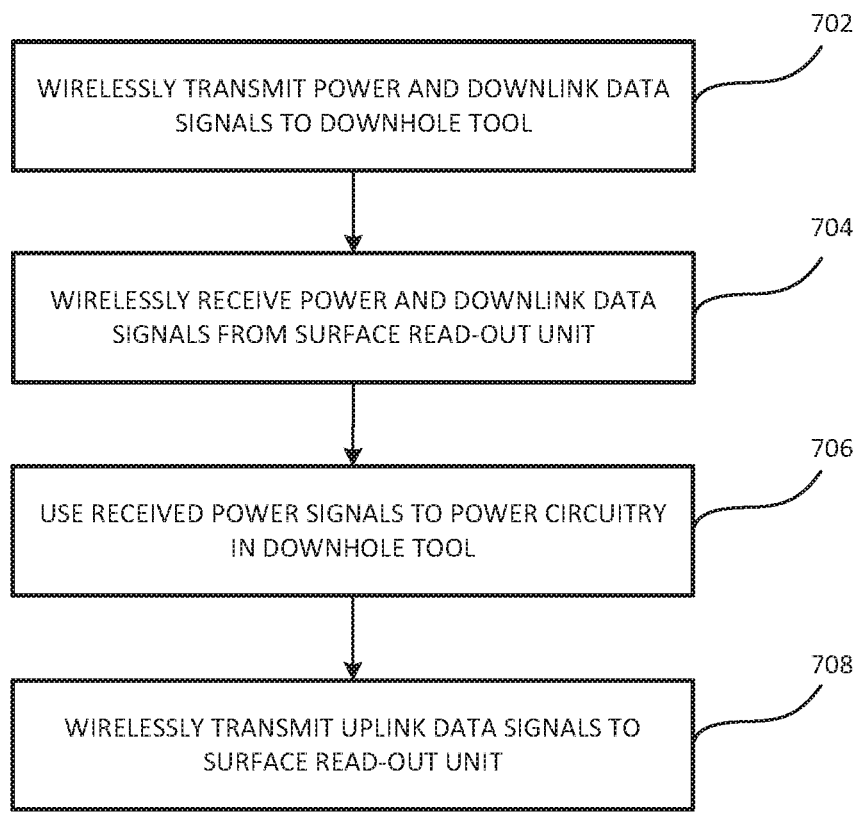
FIG. 7 is an example of a flow chart of a process for transmitting power and transceiving data signals via at least one pair of wireless couplers for use in a wellbore drilling environment according to one aspect of the disclosure.

FIG. 7 is a flow chart showing an example of a process for transceiving power signals and data signals between a surface read-out unit and a downhole tool at high speeds via wireless couplers according to one example.

In block 702, the surface read-out unit wirelessly transmits power signals and downlink data signals to the downhole tool. The signals can be wirelessly transmitted via at least one wireless coupler in the surface read-out unit to at least one wireless coupler located in the downhole tool. Downlink data signals are data signals originating from the surface read-out unit that are provided to the downhole tool. The downlink data signals can represent a command or a request for data. The power signals can be combined with the downlink data signals into a single same-frequency stream prior to transmitting the signals from the at least one wireless coupler in the surface read-out unit to the at least one wireless coupler in the downhole tool. In other examples, the power signals and the data signals are transmitted separately.

In block 704, the power signals and downlink data signals are wirelessly received from the surface read-out unit. The signals can be separated if received as a single stream, or otherwise directed to appropriate components within the downhole tool.

In block 706, the downhole tool uses the power signals to power circuitry in the downhole tool. For example, the power signals can be routed to power conversion circuitry within the downhole tool, and the power conversion circuitry can convert the power signals to usable power for components within the downhole tool.

In block 708, the downhole tool wirelessly transmits uplink data signals to the surface read-out unit. The uplink data signals can be transmitted via at least one wireless coupler to at least one wireless coupler of the surface read-out unit. Uplink data signals are data signals originating from the downhole tool that are provided to the surface read-out unit in response to data signals received from the surface read-out unit.

In some aspects, systems, devices, and methods for wirelessly transferring power signals and data signals are provided according to one or more of the following examples:

Example 1 is a system comprising: a downhole tool for a wellbore operation and including at least one coupler; and a surface read-out unit to wirelessly transmit power signals to the downhole tool and to wirelessly transceive data signals with the downhole tool, the surface read-out unit including at least one wireless coupler through which to transfer the power signals and the data signals to the at least one coupler of the downhole tool.

Example 2 is the system of example 1, wherein the downhole tool comprises: a first directional coupler for routing signals to and from a downhole tool transceiver in the downhole tool; and a splitter filter positioned between the first directional coupler and the at least one coupler to split the power signals from the data signals received from the surface read-out unit, wherein the surface read-out unit comprises: a second directional coupler for routing signals to and from a unit transceiver in the surface read-out unit; and a combiner filter positioned between the first directional coupler and the at least one wireless coupler to combine the power signals from a power supply with the data signals.

Example 3 is the system of any of example 1-2, wherein the at least one coupler includes a first coupler and a second coupler, wherein the at least one wireless coupler includes a first wireless coupler and a second wireless coupler, the first wireless coupler being positionable with respect to the first coupler to wirelessly receive signals transmitted by the downhole tool to the surface read-out unit, the second wireless coupler being positionable with respect to the second coupler to wirelessly transmit the data signals and the power signals from the surface read-out unit to the downhole tool.

Example 4 is the system of example 3, wherein the surface read-out unit includes a combiner filter positioned between (i) the second wireless coupler and (ii) a power supply and a unit transceiver, to combine the power signals and the data signals for wireless transmission to the downhole tool, wherein the downhole tool includes a splitter filter positioned between (i) the second coupler and (ii) power conversion circuitry and a tool transceiver, to split the power signals from the data signals wirelessly received from the surface read-out unit.

Example 5 is the system of any of examples 1-4, wherein the at least one coupler includes a first coupler and a second coupler, wherein the at least one wireless coupler includes a first wireless coupler and a second wireless coupler, the first wireless coupler being positionable with respect to the first coupler to wirelessly transceive the data signals with the downhole tool, the second wireless coupler being positionable with respect to the second coupler to wirelessly transmit the power signals from the surface read-out unit to the downhole tool, wherein the downhole tool includes a first directional coupler between the first coupler and a transceiver of the downhole tool, wherein the surface read-out unit includes a second directional coupler between the first wireless coupler and a unit transceiver of the surface read-out unit.

Example 6 is the system of any of examples 1-5, wherein the at least one coupler includes a first coupler, a second coupler; and a third coupler, wherein the at least one wireless coupler includes a first wireless coupler, a second wireless coupler, and a third wireless coupler, the first wireless coupler being positionable with respect to the first coupler to wirelessly transmit data signals from the surface read-out unit to the downhole tool, the second wireless coupler being positionable with respect to the second coupler to wirelessly receive data signals from the downhole tool, the third wireless coupler being positionable with respect to the third coupler to wirelessly transmit the power signals from the surface read-out unit to the downhole tool.

Example 7 is the system of any of examples 1-6, wherein the at least one coupler and the at least one wireless coupler are positionable with respect to each other to provide bi-directional wireless data communication between the surface read-out unit and the downhole tool and to wirelessly transmit the power signals to provide power to the downhole tool from the surface read-out unit.

Example 8 is the system of any of examples 1-7, wherein the downhole tool comprises an Ethernet transceiver, wherein the surface read-out unit comprises a unit Ethernet transceiver, wherein the data signals are Ethernet data signals.

Example 9 is a downhole tool comprising: a transceiver; power conversion circuitry; and at least one coupler that is positionable with respect to at least one wireless coupler of a surface read-out unit to wirelessly receive power signals from the surface read-out unit that are provided to the power conversion circuitry to provide power to the downhole tool and to wirelessly transceive data signals with the surface read-out unit, the data signals including measured data of a downhole environment or operation of the downhole tool in the downhole environment.

Example 10 is the downhole tool of example 9, the downhole tool further comprising: a first directional coupler for routing signals to and from a downhole tool transceiver in the downhole tool; and a splitter filter positioned between the first directional coupler and the at least one coupler to split the power signals from the data signals received from the surface read-out unit.

Example 11 is the downhole tool of any of examples 9-10, wherein the at least one coupler includes a first coupler and a second coupler, the first coupler being positionable with respect to a first wireless coupler of the surface read-out unit to wirelessly transmit signals received by the surface read-out unit from the downhole tool, the second coupler being positionable with respect to a second wireless coupler of the surface read-out unit to wirelessly receive the data signals and the power signals by the downhole tool from the surface read-out unit.

Example 12 is the downhole tool of example 11, wherein the downhole tool includes a splitter filter positioned between (i) the second coupler and (ii) power conversion circuitry and a tool transceiver, to split the power signals from the data signals wirelessly received from the surface read-out unit.

Example 13 is the downhole tool of any of examples 9-12, wherein the at least one coupler includes a first coupler and a second coupler, the first coupler being positionable with respect to a first wireless coupler of the surface read-out unit to wirelessly transceive the data signals with the surface read-out unit, the second coupler being positionable with respect to a second wireless coupler of the surface read-out unit to wirelessly receive the power signals by the downhole tool from the surface read-out unit, wherein the downhole tool includes a first directional coupler between the first coupler and a transceiver of the downhole tool.

Example 14 is the downhole tool of any of examples 9-13, wherein the at least one coupler includes a first coupler, a second coupler; and a third coupler, wherein the first coupler is positionable with respect to a first wireless coupler of the surface read-out unit to wirelessly receive data signals by the downhole tool from the surface read-out unit, the second coupler being positionable with respect to a second wireless coupler of the surface read-out unit to wirelessly transmit data signals to the surface read-out unit from the downhole tool, the third coupler being positionable with respect to a third wireless coupler of the surface read-out unit to wirelessly receive the power signals by the downhole tool from the surface read-out unit.

Example 15 is the downhole tool of any of examples 9-14, wherein the at least one coupler is positionable with respect to at least one wireless coupler of the surface read-out unit to provide bi-directional wireless data communication between the surface read-out unit and the downhole tool and to wirelessly receive the power signals by the downhole tool from the surface read-out unit to provide power to the downhole tool.

Example 16 is the downhole tool of any of examples 9-15, wherein the downhole tool comprises an Ethernet transceiver, wherein the data signals are Ethernet data signals.

Example 17 is a method comprising: wirelessly transmitting, by at least one wireless coupler of a surface read-out unit, power signals and downlink data signals to at least one coupler of a downhole tool; wirelessly receiving, by the at least one coupler of the downhole tool, the power signals and the downlink data signals from the at least one wireless coupler of the surface read-out unit; using the power signals to power circuitry in the downhole tool; and wirelessly transmitting, by the at least one coupler of the downhole tool, uplink data signals to the at least one wireless coupler on the surface read-out unit in response to receiving the downlink data signals, the uplink data signals including measured data about a downhole environment or operation of the downhole tool in the downhole environment.

Example 18 is the method of example 17, further comprising: routing, by a first directional coupler, signals to and from a unit transceiver in the surface read-out unit; combining, by a combiner filter positioned between the first directional coupler and the at least one wireless coupler, the power signals from a power supply with the downlink data signals; routing, by a second directional coupler, signals to and from a downhole tool transceiver in the downhole tool; and splitting, by a splitter filter positioned between the second directional coupler and the at least one coupler, the power signals from the downlink data signals received from the surface read-out unit.

Example 19 is the method of any of examples 17-18, wherein the at least one coupler and the at least one wireless coupler are positionable with respect to each other to provide bi-directional wireless data communication between the surface read-out unit and the downhole tool and to wirelessly transmit the power signals to provide power to the downhole tool from the surface read-out unit.

Example 20 is the method of any of examples 17-19, wherein wirelessly transmitting downlink data signals and uplink data signals and wirelessly receiving downlink data signals is performed by an Ethernet transceiver, wherein the downlink data signals and uplink data signals are Ethernet data signals.

Example 21 is a downhole tool comprising: a transceiver; power conversion circuitry; and at least one coupler that is positionable with respect to at least one wireless coupler of a surface read-out unit to wirelessly receive power signals from the surface read-out unit that are provided to the power conversion circuitry to provide power to the downhole tool and to wirelessly transceive data signals with the surface read-out unit, the data signals including measured data of a downhole environment or operation of the downhole tool in the downhole environment.

Example 22 is the downhole tool of example 21, further comprising: a first directional coupler for routing signals to and from a downhole tool transceiver in the downhole tool; and a splitter filter positioned between the first directional coupler and the at least one coupler to split the power signals from the data signals received from the surface read-out unit.

Example 23 is the downhole tool of any of examples 21 to 22, wherein the at least one coupler includes a first coupler and a second coupler, the first coupler being positionable with respect to a first wireless coupler of the surface read-out unit to wirelessly transmit signals received by the surface read-out unit from the downhole tool, the second coupler being positionable with respect to a second wireless coupler of the surface read-out unit to wirelessly receive the data signals and the power signals by the downhole tool from the surface read-out unit.

Example 24 is the downhole tool of example 23, wherein the downhole tool includes a splitter filter positioned between (i) the second coupler and (ii) power conversion circuitry and a tool transceiver, to split the power signals from the data signals wirelessly received from the surface read-out unit.

Example 25 is the downhole tool of any of examples 21 to 22, wherein the at least one coupler includes a first coupler and a second coupler, the first coupler being positionable with respect to a first wireless coupler of the surface read-out unit to wirelessly transceive the data signals with the surface read-out unit, the second coupler being positionable with respect to a second wireless coupler of the surface read-out unit to wirelessly receive the power signals by the downhole tool from the surface read-out unit, wherein the downhole tool includes a first directional coupler between the first coupler and a transceiver of the downhole tool.

Example 26 is the downhole tool of any of examples 21 to 22, wherein the at least one coupler includes a first coupler, a second coupler; and a third coupler, wherein the first coupler is positionable with respect to a first wireless coupler of the surface read-out unit to wirelessly receive data signals by the downhole tool from the surface read-out unit, the second coupler being positionable with respect to a second wireless coupler of the surface read-out unit to wirelessly transmit data signals to the surface read-out unit from the downhole tool, the third coupler being positionable with respect to a third wireless coupler of the surface read-out unit to wirelessly receive the power signals by the downhole tool from the surface read-out unit.

Example 27 is the downhole tool of any of examples 21 to 26, wherein the at least one coupler is positionable with respect to at least one wireless coupler of the surface read-out unit to provide bi-directional wireless data communication between the surface read-out unit and the downhole tool and to wirelessly receive the power signals by the downhole tool from the surface read-out unit to provide power to the downhole tool.

Example 28 is the downhole tool of any of examples 21 to 27, wherein the downhole tool comprises an Ethernet transceiver, wherein the data signals are Ethernet data signals.

Example 29 is the downhole tool of any of examples 21 to 28, wherein the downhole tool is in a system that comprises: a surface read-out unit to wirelessly transmit power signals to the downhole tool and to wirelessly transceive data signals with the downhole tool, the surface read-out unit including at least one wireless coupler through which to transfer the power signals and the data signals to the downhole tool.

Example 30 is a method comprising: wirelessly transmitting, by at least one wireless coupler of a surface read-out unit, power signals and downlink data signals to at least one coupler of a downhole tool; wirelessly receiving, by the at least one coupler of the downhole tool, the power signals and the downlink data signals from the at least one wireless coupler of the surface read-out unit; using the power signals to power circuitry in the downhole tool; and wirelessly transmitting, by the at least one coupler of the downhole tool, uplink data signals to the at least one wireless coupler on the surface read-out unit in response to receiving the downlink data signals, the uplink data signals including measured data about a downhole environment or operation of the downhole tool in the downhole environment.

Example 31 is the method of example 30, further comprising: routing, by a first directional coupler, signals to and from a unit transceiver in the surface read-out unit; and combining, by a combiner filter positioned between the first directional coupler and the at least one wireless coupler, the power signals from a power supply with the downlink data signals.

Example 32 is the method of any of examples 30 to 31, further comprising: routing, by a second directional coupler, signals to and from a downhole tool transceiver in the downhole tool; and splitting, by a splitter filter positioned between the second directional coupler and the at least one coupler, the power signals from the downlink data signals received from the surface read-out unit.

Example 33 is the method of any of examples 30 to 32, wherein the at least one coupler and the at least one wireless coupler are positionable with respect to each other to provide bi-directional wireless data communication between the surface read-out unit and the downhole tool.

Example 34 is the method of any of examples 30 to 33, wherein the at least one coupler and the at least one wireless coupler are positionable with respect to each other to wirelessly transmit the power signals to provide power to the downhole tool from the surface read-out unit.

Example 35 is the method of any of examples 30 to 34, wherein wirelessly transmitting downlink data signals and uplink data signals and wirelessly receiving downlink data signals is performed by an Ethernet transceiver, wherein the downlink data signals and uplink data signals are Ethernet data signals.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
 a downhole tool for a wellbore operation and including:
  a first wireless coupler;
  a first directional coupler for routing high frequency data signals to and from a downhole tool transceiver in the downhole tool;
  the downhole tool transceiver for providing high frequency tool data signals to the first directional coupler;
  a splitter filter for separating high frequency surface unit data signals and low frequency power signals; and
  power conversion circuitry for using the low frequency power signals to provide power to the downhole tool; and
 a surface read-out unit to wirelessly transmit the low frequency power signals and the high frequency surface unit data signals to the downhole tool and to wirelessly receive the high frequency tool data signals from the downhole tool, the surface read-out unit including:
  a second wireless coupler for routing the low frequency power signals and the high frequency surface unit data signals to the first wireless coupler of the downhole tool;
  a second directional coupler for routing high frequency data signals to and from a unit transceiver in the surface read-out unit;

the unit transceiver for transmitting the high frequency surface unit data signals to the second directional coupler;
a combiner filter for combining the low frequency power signals and the high frequency surface unit data signals from the second directional coupler; and
a power supply for providing the low frequency power signals to the power conversion circuitry,
wherein each of the first wireless coupler and the second wireless coupler includes a split-core radio frequency transformer having a pot core within a magnetic-non-conductive material.

2. The system of claim 1, wherein the splitter filter is positioned between the first directional coupler and the first wireless coupler, and wherein the combiner filter is positioned between the second directional coupler and the second wireless coupler.

3. The system of claim 1,
the first wireless coupler being positionable with respect to the first directional coupler to wirelessly receive signals transmitted by the surface read-out unit, the second wireless coupler being positionable with respect to the second directional coupler to wirelessly transmit the surface unit data signals and the power signals from the surface read-out unit to the down hole tool.

4. The system of claim 1, wherein the surface read-out unit includes the combiner filter positioned between (i) the second wireless coupler and (ii) the power supply and the unit transceiver, to combine the power signals and the surface unit data signals for wireless transmission to the downhole tool, and
wherein the downhole tool includes the splitter filter positioned between (i) the first wireless coupler and (ii) the power conversion circuitry and the downhole tool transceiver, to split the power signals from the surface unit data signals wirelessly received from the surface read-out unit.

5. The system of claim 1,
the first wireless coupler being positionable with respect to the first directional coupler to wirelessly transmit the tool data signals with the downhole tool, the second wireless coupler being positionable with respect to the second directional coupler to wirelessly transmit the power signals from the surface read-out unit to the downhole tool,
wherein the downhole tool includes the first directional coupler between the first wireless coupler and the downhole tool transceiver of the downhole tool, and
wherein the surface read-out unit includes the second directional coupler between the second wireless coupler and the unit transceiver of the surface read-out unit.

6. The system of claim 1, wherein the first directional coupler, the second directional coupler, the first wireless coupler, and the second wireless coupler are positionable with respect to each other to provide bi-directional wireless data communication between the surface read-out unit and the downhole tool and to wirelessly transmit the power signals to provide power to the downhole tool from the surface read-out unit.

7. The system of claim 1, wherein the downhole tool comprises an Ethernet transceiver,
wherein the surface read-out unit comprises a unit Ethernet transceiver, and
wherein the surface unit data signals are Ethernet data signals.

8. A downhole tool comprising:
a downhole tool transceiver;
power conversion circuitry;
a first wireless coupler, wherein the first wireless coupler includes a split-core radio frequency transformer having a pot core within a magnetic-non-conductive material;
a first directional coupler for routing high frequency data signals to and from the downhole tool transceiver that is positionable with respect to a second wireless coupler of a surface read-out unit to wirelessly receive low frequency power signals from the surface read-out unit that are provided to the power conversion circuitry to provide power to the downhole tool and to wirelessly receive high frequency tool data signals with the surface read-out unit, the surface read-out unit comprising a second directional coupler for routing high frequency data signals to and from a unit transceiver in the surface read-out unit, the second directional coupler being positionable with respect to a combiner filter of the surface read-out unit for combining the low frequency power signals and high frequency surface unit data signals, the high frequency tool data signals including measured data of a downhole environment or operation of the downhole tool in the downhole environment; and
a splitter filter positionable between the first directional coupler and the first wireless coupler to split the low frequency power signals from the high frequency surface unit data signals received from the surface read-out unit.

9. The downhole tool of claim 8,
the second directional coupler being positionable with respect to the second wireless coupler of the surface read-out unit to wirelessly transmit signals to the downhole tool;
the first directional coupler positionable with respect to the second wireless coupler of the surface read-out unit to wirelessly receive signals from the surface read-out unit; and
the first directional coupler positionable with respect to the splitter filter of the downhole tool to wirelessly receive the surface unit data signals and the power signals by the downhole tool from the surface read-out unit.

10. The downhole tool of claim 8, wherein the downhole tool includes the splitter filter positioned between (i) the first wireless coupler and (ii) the power conversion circuitry and the downhole tool transceiver, to split the power signals from the surface unit data signals wirelessly received from the surface read-out unit.

11. The downhole tool of claim 8, wherein the first directional coupler is positionable with respect to the second wireless coupler of the surface read-out unit to provide bi-directional wireless data communication between the surface read-out unit and the downhole tool and to wirelessly receive the power signals by the downhole tool from the surface read-out unit to provide power to the downhole tool.

12. The downhole tool of claim 8, wherein the downhole tool comprises an Ethernet transceiver, and
wherein the surface unit data signals are Ethernet data signals.

13. A method comprising:
providing, by a downhole tool transceiver of a downhole tool, high frequency tool data signals to a first directional coupler of the downhole tool;

routing, by the first directional coupler, high frequency data signals to and from the downhole tool transceiver;

splitting, by a splitter filter of the downhole tool, high frequency surface unit data signals and low frequency power signals;

using the low frequency power signals to power circuitry in the downhole tool;

routing, by a first wireless coupler of a surface read-out unit, the low frequency power signals and the high frequency surface unit data signals to a second wireless coupler of the downhole tool, wherein each of the first wireless coupler and the second wireless coupler includes a split-core radio frequency transformer having a pot core within a magnetic-non-conductive material;

transmitting, by a unit transceiver of the surface read-out unit, the high frequency surface unit data signals to a second directional coupler of the surface read-out unit;

routing, by the second directional coupler, high frequency data signals to and from the unit transceiver; and combining, by a combiner filter of the surface read-out unit, the low frequency power signals and the high frequency surface unit data signals from the second directional coupler.

14. The method of claim 13, wherein the first wireless coupler and the second wireless coupler are positionable with respect to each other to provide bi-directional wireless data communication between the surface read-out unit and the downhole tool and to wirelessly transmit the power signals to provide power to the downhole tool from the surface read-out unit.

15. The method of claim 13, wherein transmitting the surface unit data signals is performed by an Ethernet transceiver, and wherein the surface unit data signals are Ethernet data signals.

* * * * *